(12) United States Patent
Park (10) Patent No.: US 10,046,757 B2
(45) Date of Patent: Aug. 14, 2018

(54) SYSTEM AND METHOD FOR DRIVING MODE CONVERSION OF HYBRID VEHICLE

(71) Applicants: Hyundai Motor Company, Seoul (KR); Kia Motors Corporation, Seoul (KR)

(72) Inventor: Joonyoung Park, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 12 days.

(21) Appl. No.: 15/256,373

(22) Filed: Sep. 2, 2016

(65) Prior Publication Data

US 2017/0217424 A1   Aug. 3, 2017

(30) Foreign Application Priority Data

Feb. 2, 2016  (KR) ........................ 10-2016-0012953

(51) Int. Cl.
*B60W 20/12* (2016.01)
*B60W 50/00* (2006.01)
*B60W 20/20* (2016.01)

(52) U.S. Cl.
CPC ............ *B60W 20/12* (2016.01); *B60W 20/20* (2013.01); *B60W 50/0097* (2013.01); *B60W 2050/0089* (2013.01); *B60W 2520/10* (2013.01); *B60W 2540/10* (2013.01); *B60W 2540/12* (2013.01); *B60W 2550/10* (2013.01); *B60W 2550/402* (2013.01); *Y02T 10/48* (2013.01); *Y10S 903/93* (2013.01)

(58) Field of Classification Search
CPC .. B60W 20/12; B60W 20/20; B60W 50/0097; B60W 2050/0089; B60W 2520/10
See application file for complete search history.

(56) References Cited

U.S. PATENT DOCUMENTS

2014/0335994 A1* 11/2014 Otake ................... B60W 10/06
477/3

FOREIGN PATENT DOCUMENTS

JP       2008-068739 A     3/2008
KR   10-2013-0074193 A    7/2013
(Continued)

*Primary Examiner* — Michael D Lang
(74) *Attorney, Agent, or Firm* — Mintz Levin Cohn Ferris Glovsky and Popeo, P.C.; Peter F. Corless (57) ABSTRACT

A system for a driving mode conversion of a vehicle is provided. The system includes a driving information detecting unit that detects driving information based on a vehicle driving using sensors within the vehicle. A driving propensity determining unit determines a driving propensity based on average vehicle speed and a position variation of accelerator and brake pedals. A predicting unit learns an acceleration and deceleration prediction model based on the driving information, and generates a near future intention prediction value to which a vehicle driving environment and the driving propensity are reflected utilizing the prediction model. A controller determines whether an engine starting is performed by calculating current required power of a driver based on a pedal position value, and determines whether the engine starting is performed by comparing the near future acceleration and deceleration intention prediction value with the position value of the pedal.

14 Claims, 8 Drawing Sheets

(56) References Cited

FOREIGN PATENT DOCUMENTS

| KR | 10-1393543 B1 | 5/2014 |
| KR | 10-2014-0099056 A | 8/2014 |
| KR | 10-2015-0034899 A | 4/2015 |

* cited by examiner

RELATED ART

RELATED ART

SYSTEM AND METHOD FOR DRIVING MODE CONVERSION OF HYBRID VEHICLE

CROSS-REFERENCE TO RELATED APPLICATION

This application claims priority to and the benefit of Korean Patent Application No. 10-2016-0012953 filed in the Korean Intellectual Property Office on Feb. 2, 2016, the entire contents of which are incorporated herein by reference.

BACKGROUND (a) Field of the Invention

The present invention relates to a system and a method for a driving mode conversion of a hybrid vehicle, and more particularly, to a system and method for a driving mode conversion that prevent an unnecessary engine on/off and improve drivability and fuel efficiency by predicting a near future driving intention of a driver taking account of a driving environment of the vehicle and a propensity of the driver, and utilize the predicted near future driving intention of the driver to determine whether an engine is started.

(b) Description of the Related Art

In general, in accordance with the constant demand for an improvement of fuel efficiency of a vehicle and the tightening of exhaust gas regulations, the demand for an environmentally-friendly vehicle has increased. As a practical alternative thereof, a hybrid electric vehicle and a plug-in hybrid electric vehicle (HEV/PHEV) have been developed. The hybrid vehicle may provide optimal output torque based on how an engine and a motor are harmoniously operated in a process in which the hybrid vehicle is driven using two power sources consisting of the engine and the motor. In other words, as a driving mode of the hybrid vehicle, an electric vehicle (EV) mode by electric power, and an HEV mode that drives the vehicle using two or more powers such as the engine, the electric power, and the like are applied. In addition, in the hybrid vehicle, the determination of a conversion point of time of an EV/HEV mode is a factor in improving drivability and fuel efficiency of the vehicle.

Figure 1:
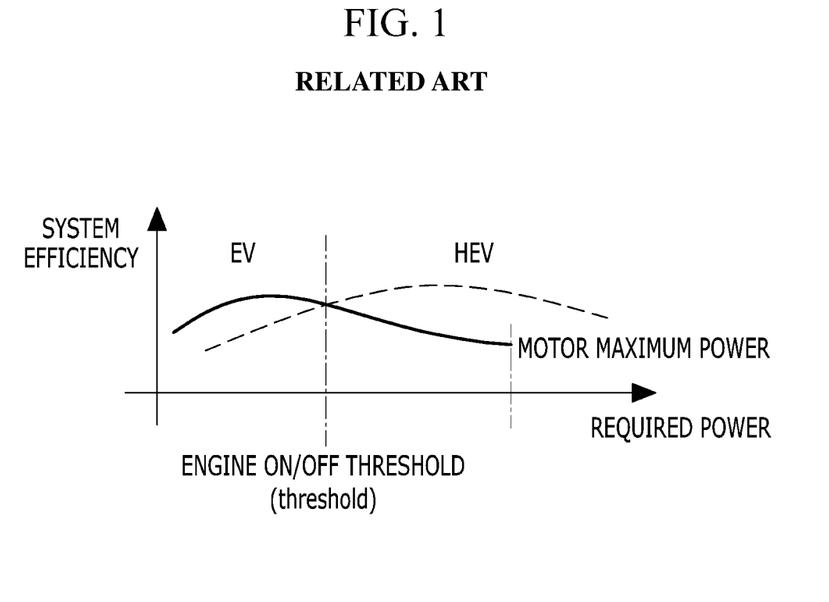
FIG. 1 is a graph illustrating an EV/HEV mode determination reference in a hybrid vehicle according to the related art.

Meanwhile, a driving mode conversion method of a hybrid vehicle according to the related art and a disadvantage thereof will be described with reference to FIGS. 1 and 2. FIG. 1 is a graph illustrating an EV/HEV mode determination reference in a hybrid vehicle according to the related art. Referring to FIG. 1, a typical engine on/off control in the hybrid vehicle includes a state of charge (SOC) of a battery, a warm up of an engine, a required power condition of a driver, and the like, and a turn on/off of the engine is basically at proper required power by system driving efficiency.

Figure 2:
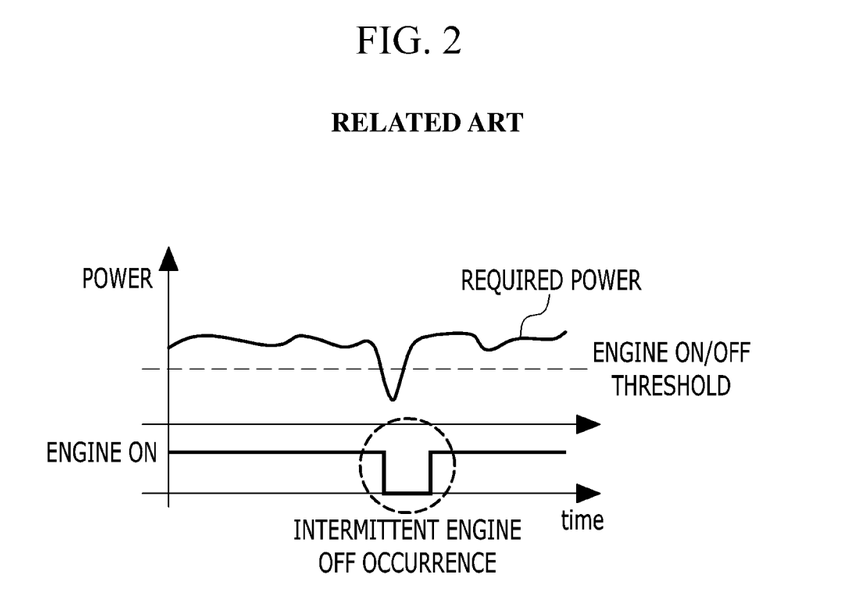
FIGS. 2 and 3 are graphs illustrating engine off and engine on occurrences according to an intermittent change in required power according to the related art.
Figure 3:
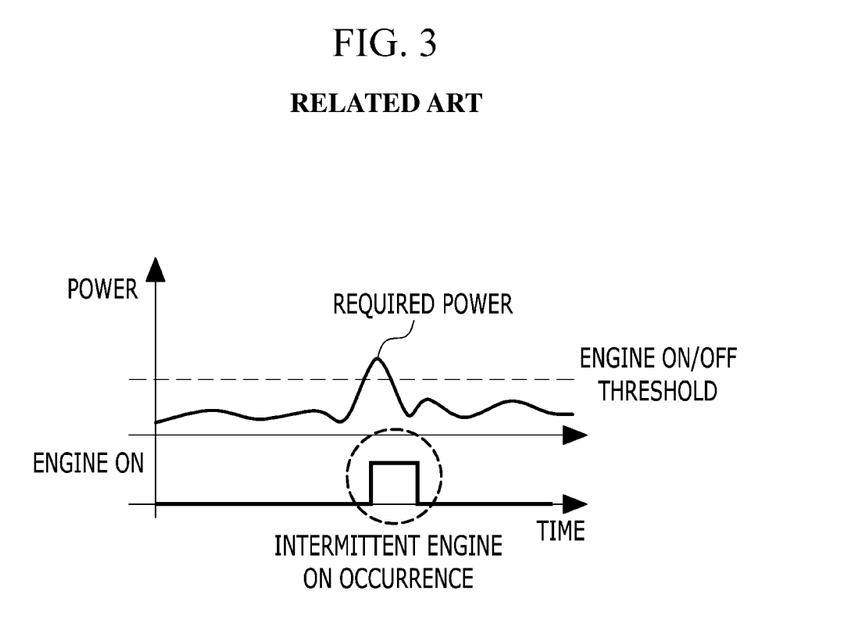

FIGS. 2 and 3 are graphs illustrating engine off and engine on occurrences according to an intermittent change in required power according to the related art. Referring to FIG. 2, an engine off due to an intermittent accelerator tip out (APS Tip out) occurs during a high speed and fixed speed driving of the hybrid vehicle. Further, referring to FIG. 3, an engine starting (ON) due to an intermittent accelerator tip in (APS Tip in) occurs during a low speed driving of the hybrid vehicle in a parking lot or a congested area. Accordingly, since power for cranking during engine on/off according to the intermittent change in the required power and additional fuel for the engine starting are used, it is disadvantageous for the fuel efficiency, and since drivability is deteriorated due to a frequent engine on/off, an unnecessary engine starting should be avoided.

Figure 4:
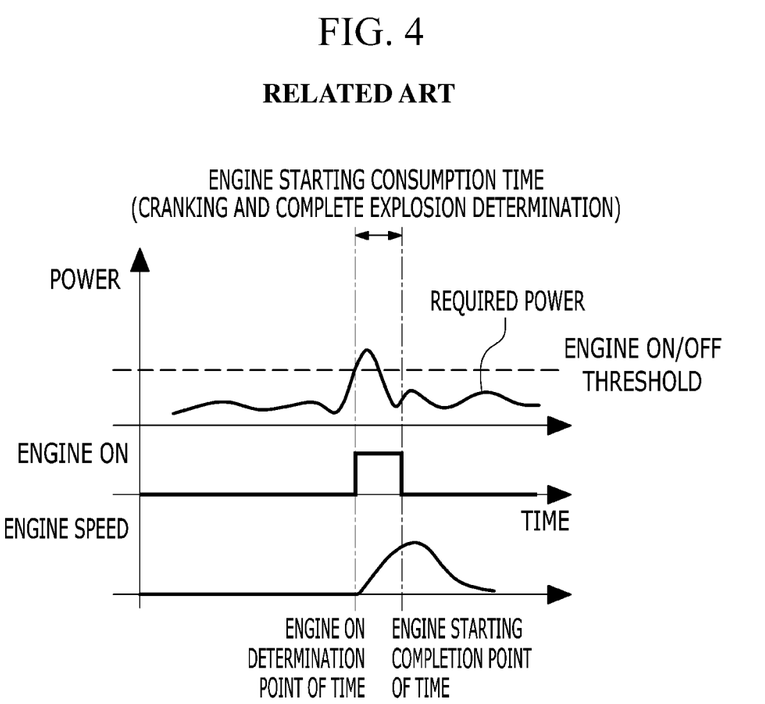
FIG. 4 is a graph illustrating a time delay between an engine on determination point of time and an engine on completion point of time according to the related art.

In addition, FIG. 4 is a graph illustrating a time delay between an engine on determination point of time and an engine on completion point of time according to the related art. Referring to FIG. 4, it illustrates the time delay between the engine on determination point of time and an actual engine starting completion point of time in an environment to which the intermittent change in the required power of the driver is input. In particular, since the required power exceeds a threshold at the engine on determination point of time, the HEV mode is efficient. However, since the required power is decreased below the threshold at the engine starting completion point of time, the HEV mode may be inefficient. In other words, an inefficient driving occurs due to the time delay between the engine on/off determination point of time and the engine on/off completion point of time in a driving environment to which the intermittent change in the required power of the driver is input, and thus is disadvantageous in view of the system efficiency such as the fuel efficiency, the drivability, and the like.

The above information disclosed in this section is merely for enhancement of understanding of the background of the invention and therefore it may contain information that does not form the prior art that is already known in this country to a person of ordinary skill in the art.

SUMMARY

The present invention provides a system and a method for a driving mode conversion of a hybrid vehicle having advantages of preventing an unnecessary engine on/off and improving drivability and fuel efficiency by predicting a near future driving intention of a driver taking account of a driving environment of the vehicle and a propensity of the driver, and utilizing the predicted near future driving intention of the driver to determine whether an engine starting is performed.

An exemplary embodiment of the present invention provides a system for a driving mode conversion of a hybrid vehicle that may include: a driving information detecting unit configured to detect driving information based on a vehicle driving using a variety of sensors of the hybrid vehicle; a driving propensity determining unit configured to determine a driving propensity based on average speed of the vehicle, a position variation of an accelerator pedal, and a position variation of a brake pedal based on the driving information; an acceleration and deceleration predicting unit configured to learn an acceleration and deceleration prediction model based on the driving information, and generate a near future acceleration and deceleration intention prediction value to which a driving environment of the vehicle and the driving propensity are reflected utilizing the acceleration and deceleration prediction model; and a hybrid controller configured to determine whether an engine starting is performed by calculating current required power of a driver based on a position value of a pedal detected by the driving information detecting unit, and determine whether the engine starting is performed by comparing the near future acceleration and deceleration intention prediction value with the position value of the pedal.

The acceleration and deceleration predicting unit may include a neural network that learns the acceleration and deceleration prediction model for each of driving propensities utilizing a machine learning technique using front behavior information obtained by a radar sensor, road environment information obtained by a navigation, and the driving propensity as input information. The acceleration and deceleration predicting unit may be configured to generate the acceleration and deceleration prediction model for each of the driving propensities based on data accumulated through a test driving before a release of the vehicle utilizing the neural network.

The acceleration and deceleration predicting unit may further be configured to generate the acceleration and deceleration prediction model for each of the driving propensities which are personalized by further reflecting vehicle behavior data learned through an actual vehicle driving of the driver after the release to the acceleration and deceleration prediction model for each of the driving propensities generated before the release of the vehicle. The near future acceleration and deceleration intention prediction value may be a position of an accelerator pedal or a position of a brake pedal in a near future as much as a set time from a point of time at which whether the engine starting is performed is determined by calculating the current required power of the driver.

The driving propensity determining unit may be configured to determine the driving propensity as any one of a mild driving propensity, a normal driving propensity, and a sporty driving propensity by classifying a short-term driving propensity index calculated by configuring a fuzzy membership function using at least one measurement factor of a position variation of the acceleration pedal, a position variation of the brake pedal, an average vehicle speed, and a degree of gradient detected by the driving information detecting unit as input variables at a predetermined ratio. The hybrid controller may be configured to maintain an engine non-starting state when the near future acceleration and deceleration intention prediction value is decreased to less than the position value of the pedal when an engine starting according to the current required power is determined during the engine non-starting. The hybrid controller may further be configured to maintain an engine starting state when the near future acceleration and deceleration intention prediction value is increased to the position value or more of the pedal when an engine non-starting according to the current required power is determined during the engine starting.

Another exemplary embodiment of the present invention provides a method for a driving mode conversion of a hybrid vehicle that may include calculating current required power of a driver based on a position value of a pedal detected by a driving information detecting unit; generating a near future acceleration and deceleration intention prediction value to which a driving environment of the vehicle and a driving propensity are reflected utilizing an acceleration and deceleration prediction model; comparing the current required power with threshold for an engine starting and determining whether the engine starting is performed; and comparing the near future acceleration and deceleration intention prediction value with the position value of the pedal and determining whether the engine starting is performed.

The threshold may be a value to which hysteresis for starting an engine according to a change of the current required power of the driver is applied. In addition, when the engine starting is determined, the method may include when the near future acceleration and deceleration intention prediction value is maintained to the position value or more of the pedal, determining the engine starting; and when the near future acceleration and deceleration intention prediction value is decreased to less than the position value of the pedal, maintaining a current engine state.

A first margin may be set to allow the near future acceleration and deceleration intention prediction value to be decreased as much as a predetermined amount or less than the position value of the pedal, and when a decrease amount of the near future acceleration and deceleration intention prediction value is within an allowance width by the first margin, the engine starting may be determined. When an engine non-starting is determined, the method may include when the near future acceleration and deceleration intention prediction value is maintained to less than the position value of the pedal, determining an engine non-starting; and when the near future acceleration and deceleration intention prediction value is increased to the position value or more of the pedal, maintaining the current engine state. In addition, a second margin may be set to allow the near future acceleration and deceleration intention prediction value to be increased as much as a predetermined amount or more than the position value of the pedal, and when an increase amount of the near future acceleration and deceleration intention prediction value is within an allowance width by the second margin, the engine non-starting may be determined.

According to an exemplary embodiment of the present invention, the unnecessary engine on/off may be prevented by predicting the near future driving intention of the driver taking account of the driving environment of the vehicle and the propensity of the driver, and utilizing the predicted near future driving intention of the driver in determining the EV/HEV determination. Further, due to the prevention of the unnecessary engine on/off, the fuel efficiency such as an amount of injection compensation, and the like for cranking energy and combustion stabilization may be improved, and due to a decrease in an impact of the driving mode conversion, the drivability may be improved.

Further, an acceleration and deceleration intention of the driver to which a driving propensity of the driving is reflected may be more accurately predicted by a neural network that learns an acceleration and deceleration prediction model for each of driving propensities of the driver utilizing a machine learning technique, and the predicted acceleration and deceleration intention of the driver may be utilized in determining whether the engine starting is performed, to thus prevent an inefficient driving mode conversion by an existing sudden change of the driving intention.

BRIEF DESCRIPTION OF THE DRAWINGS

The drawings are used for reference in describing exemplary embodiments of the present invention and thus, the technical spirit of the present invention should not be analyzed to be limited to the accompanying drawings.

DESCRIPTION OF SYMBOLS

100: system for driving mode conversion
110: driving information detecting unit
120: driving propensity determining unit
130: acceleration and deceleration predicting unit
140: hybrid controller

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the following detailed description, only certain exemplary embodiments of the present invention have been shown and described, simply by way of illustration. As those skilled in the art would realize, the described exemplary embodiments may be modified in various different ways, all without departing from the spirit or scope of the present invention. Accordingly, the drawings and description are to be regarded as illustrative in nature and not restrictive. Like reference numerals designate like elements throughout the specification. Throughout the specification, portions denoted by like reference numerals mean like elements.

Figure 5:
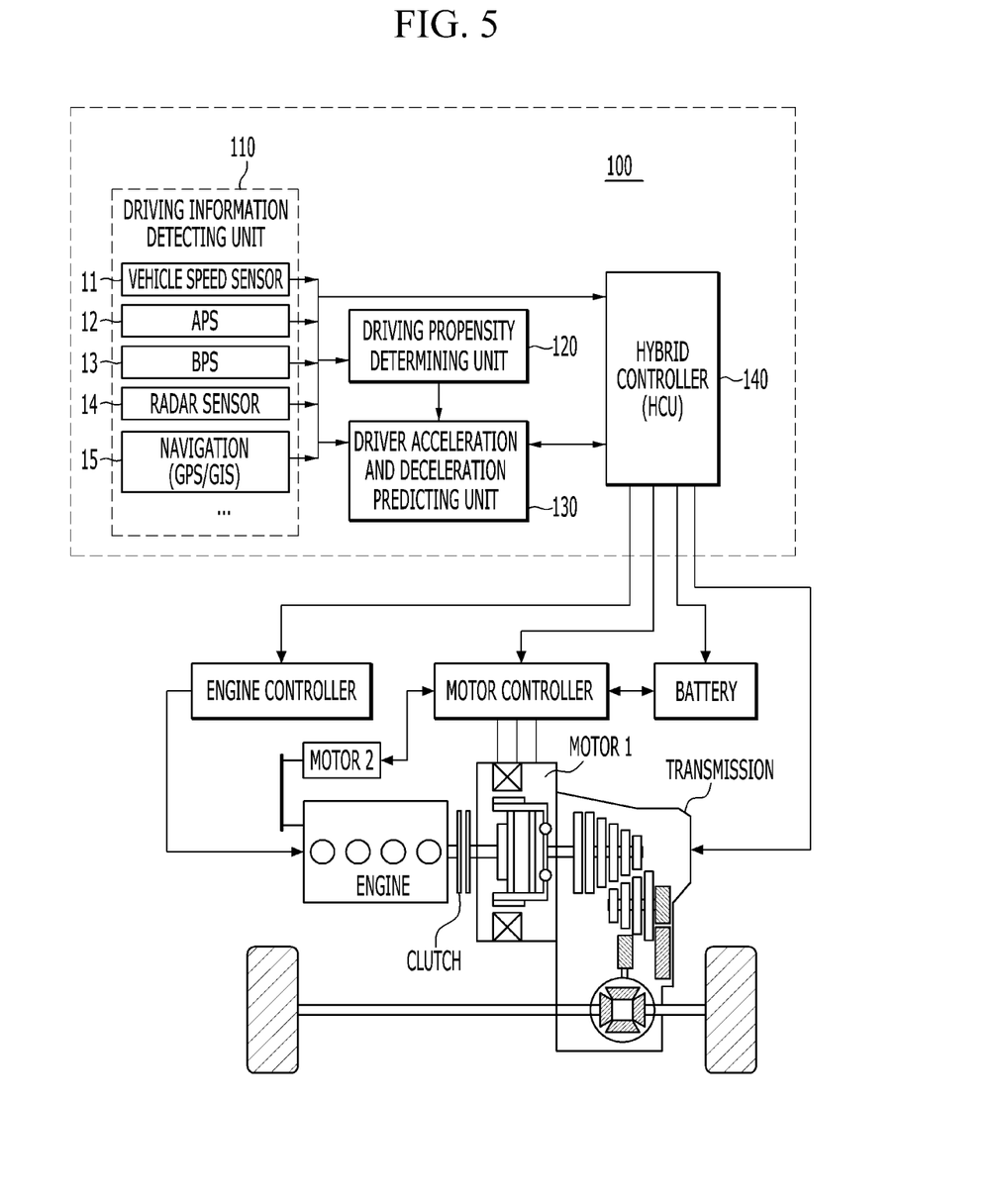
FIG. 5 is a block diagram schematically illustrating a system for a driving mode conversion of a hybrid vehicle according to an exemplary embodiment of the present invention.

A hybrid vehicle used in the present specification includes a plug in hybrid vehicle, a hydrogen fuel vehicle, and other alternative fuel (e.g., fuel obtained from resources except for oil) vehicles. Hereinafter, a system and method for a driving mode conversion of a hybrid vehicle according to an exemplary embodiment of the present invention will be described in detail with reference to the accompanying drawings. FIG. 5 is a block diagram schematically illustrating a system for a driving mode conversion of a hybrid vehicle according to an exemplary embodiment of the present invention.

Referring to FIG. 5, a system 100 for a driving mode conversion of a hybrid vehicle according to an exemplary embodiment of the present invention may include a driving information detecting unit 110, a driving propensity determining unit 120, an acceleration and deceleration predicting unit 130, and a hybrid controller 140. The controller 140 may be configured to operate the other various units of the system.

Particularly, the driving information detecting unit 110 may be configured to detect driving information based on a driving of the vehicle using at least one of a vehicle speed sensor 11, an accelerator position sensor (APS) 12, a brake pedal sensor (BPS) 13, a radar sensor 14, and a navigation 15. The driving information detecting unit 110 may specifically be configured to detect an operation state of an accelerator pedal using the APS 12 (e.g., measure an engagement degree of the pedal), and detect an operation state of a brake using the BPS 13 (e.g., measure an engagement degree of the pedal). When the accelerator pedal is fully engaged, a position value of the accelerator pedal is 100%, and when the accelerator disengaged (e.g., no pressure is exerted onto the pedal), the position value of the accelerator pedal is 0%.

Further, the driving information detecting unit 110 may be configured to detect vehicle speed using the vehicle speed sensor 11, and detect radar information (front behavior information) including a relative distance and acceleration with a front vehicle using a front radar sensor 14. The radar sensor 14 may utilize a front radar for a smart cruise control (SCC), or may utilize various sensors such as an ultrasonic sensor, a laser sensor, and the like. The driving information detecting unit 110 may be configured to detect navigation information (road environment information) such as a type of road, a degree of congestion (e.g., traffic), a speed limit, a crossroad, a tollgate, a turn (e.g., curvature of a road), gradient information, and the like based on position information of the vehicle using the navigation 15. In particular, the navigation 15 may refer to a navigation map embedded to provide the above-mentioned information and traffic information collected by external wireless communication (e.g., telematics, or the like).

The driving propensity determining unit 120 (e.g., a sensor) may be configured to detect a driving propensity of a driver based on driving patterns such as an average speed, a position variation of an accelerator pedal (dAPS), a position variation of a brake pedal (dBPS), and the like based on a vehicle driving manipulation of the driver. The driving propensity may vary based on a change of emotion or instant driving intention of the driver, the radar information, the navigation information, and the like. Accordingly, a form of the driving manipulation represented in a relatively short time unit is quantitatively digitalized, to determine an instant acceleration/deceleration intention of the driver.

For example, the driving propensity determining unit 120 may be configured to calculate a short-term driving propensity index (SI=0~100%) by configuring a fuzzy membership function using measurement factors such as the position variation of the acceleration pedal, the position variation of the brake pedal, the average vehicle speed, the degree of gradient, and the like detected by the driving information detecting unit 110 as input variables. The driving propensity determining unit 120 may then be configured to determine the driving propensity of the driver at a plurality of levels by classifying the calculated short-term driving propensity index (SI=about 0~100%) at a predetermined reference ratio based on a driving propensity intensity. In other words, the driving propensity determining unit 120 may be configured to determine the driving propensity of the driver to be any one of a mild (SI=about 0~20%) driving propensity, a normal (SI=about 21~40%) driving propensity, and a sporty (SI=about 41~60%) driving propensity by classifying the driving propensity of the driver based on the driving propensity intensity.

Particularly, as the driving propensity of the driver is closer to the mild driving propensity, the driver may be determined as the driver having a defensive driving pattern that maintains a distance with a front vehicle by a margin, and as the driving propensity of the driver is closer to the sporty driving propensity, the driver may be determined as the driver having an offensive driving pattern that maintains a minimal distance with the front vehicle.

The acceleration and deceleration predicting unit 130 may be configured to learn an acceleration and deceleration prediction model for each of the driving propensities utilizing a machine learning technique, and generate a near future acceleration and deceleration intention prediction value of the driver to which a driving environment of the vehicle and the driving propensity may be reflected utilizing the acceleration and deceleration prediction model. The acceleration and deceleration predicting unit 130 may be configured to generate the near future acceleration and deceleration prediction value of the driver utilizing the vehicle speed, the radar information, and the navigation information detected by the driving information detecting unit 110, and the driving propensity of the driver, as input information.

Figure 6:
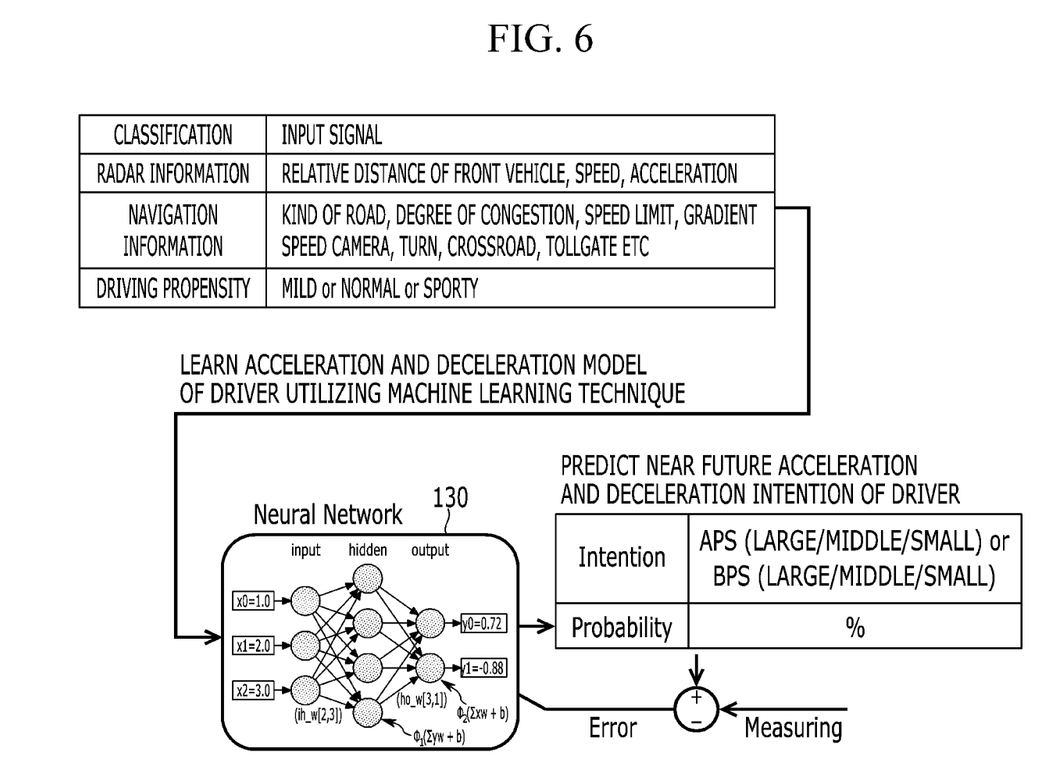
FIG. 6 illustrates a method for predicting a near future driver acceleration and deceleration intention of an acceleration and deceleration predicting unit according to an exemplary embodiment of the present invention.

FIG. 6 illustrates a method for predicting a near future driver acceleration and deceleration intention of an acceleration and deceleration predicting unit according to an exemplary embodiment of the present invention. Referring to FIG. 6, the acceleration and deceleration predicting unit 130 according to an exemplary embodiment of the present invention may include a neural network that learns the acceleration and deceleration prediction model for each of the driving propensities of the driver utilizing the machine learning technique.

The acceleration and deceleration predicting unit 130 may be configured to generate a near future acceleration and deceleration prediction model for each of the driving propensities based on data accumulated through a test driving before a release of the vehicle utilizing the neural network. Further, the acceleration and deceleration predicting unit 130 may be configured to generate a near future acceleration and deceleration prediction model for each of driving propensities personalized to the driver by further reflecting vehicle behavior data learned through an actual vehicle driving of the driver after the release to the near future acceleration and deceleration prediction model for each of the driving propensities generated utilizing the neural network. In particular, the acceleration and deceleration predicting unit 130 may be configured to apply behavior data learned based on the determination of any one of the mild driving propensity, the normal driving propensity, and the sporty driving propensity of the driver to the near future acceleration and deceleration prediction model of the corresponding driving propensity.

The above-mentioned acceleration and deceleration predicting unit 130 may be configured to calculate a near future acceleration and deceleration intention prediction value based on the driving propensity of the driver by utilizing the driving environment in which the vehicle speed, the radar information, and the navigation information are summarized, and any one of the mild driving propensity, the normal driving propensity, and the sporty driving propensity of the driver, as the input information. For example, the near future acceleration and deceleration intention prediction value indicates a position of the accelerator pedal or the brake pedal predicted at a predetermined time (e.g., about 5 seconds) of near future.

The hybrid controller 140 may be configured to operate each of the units for the driving mode conversion of the hybrid vehicle according to an exemplary embodiment of the present invention, and collectively may be configured to operate an engine controller and a motor controller connected to the top level controller via a network. The hybrid controller 140 may be configured to analyze current required power of the driver based on the position of the accelerator pedal or the position of the brake pedal detected by the driving information detecting unit 110 to determine whether the engine starting is performed. In addition, the hybrid controller 140 may be configured to compare whether the near future acceleration and deceleration prediction value from a point of time at which whether the engine starting is performed is determined maintains the current required power to determine whether the engine starting is performed.

Figure 7:
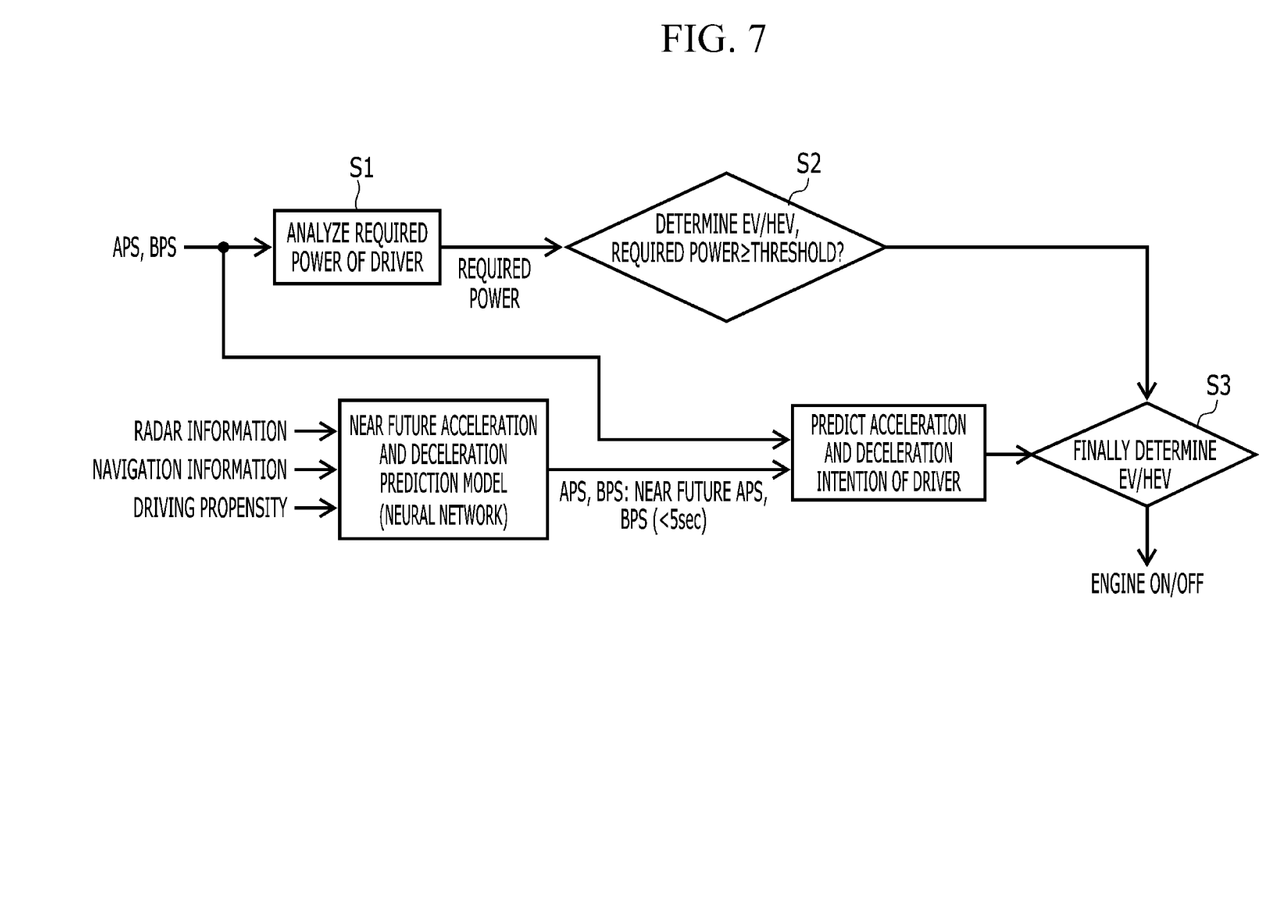
FIG. 7 illustrates a method for determining an EV/HEV mode utilizing a near future acceleration and deceleration prediction model of a hybrid controller according to an exemplary embodiment of the present invention.

FIG. 7 illustrates a method for determining an EV/HEV mode utilizing a near future acceleration and deceleration prediction model of a hybrid controller according to an exemplary embodiment of the present invention. Referring to FIG. 7, the hybrid controller 140 according to an exemplary embodiment of the present invention may be configured to analyze required power of the driver based on a manipulation of the accelerator pedal or the brake pedal of the driver (S1), and determine an EV/HEV mode based on whether the required power is a threshold or more for an engine starting (ON) (S2). In addition, the hybrid controller 140 may be configured to determine an EV/HEV mode by additionally applying acceleration and deceleration intention prediction information of the driver utilizing the near future acceleration and deceleration prediction model from the acceleration and deceleration predicting unit 130 to the determination result of the EV/HEV mode (S3), and determine whether the engine starting is performed (ON/OFF) accordingly.

Figure 8:
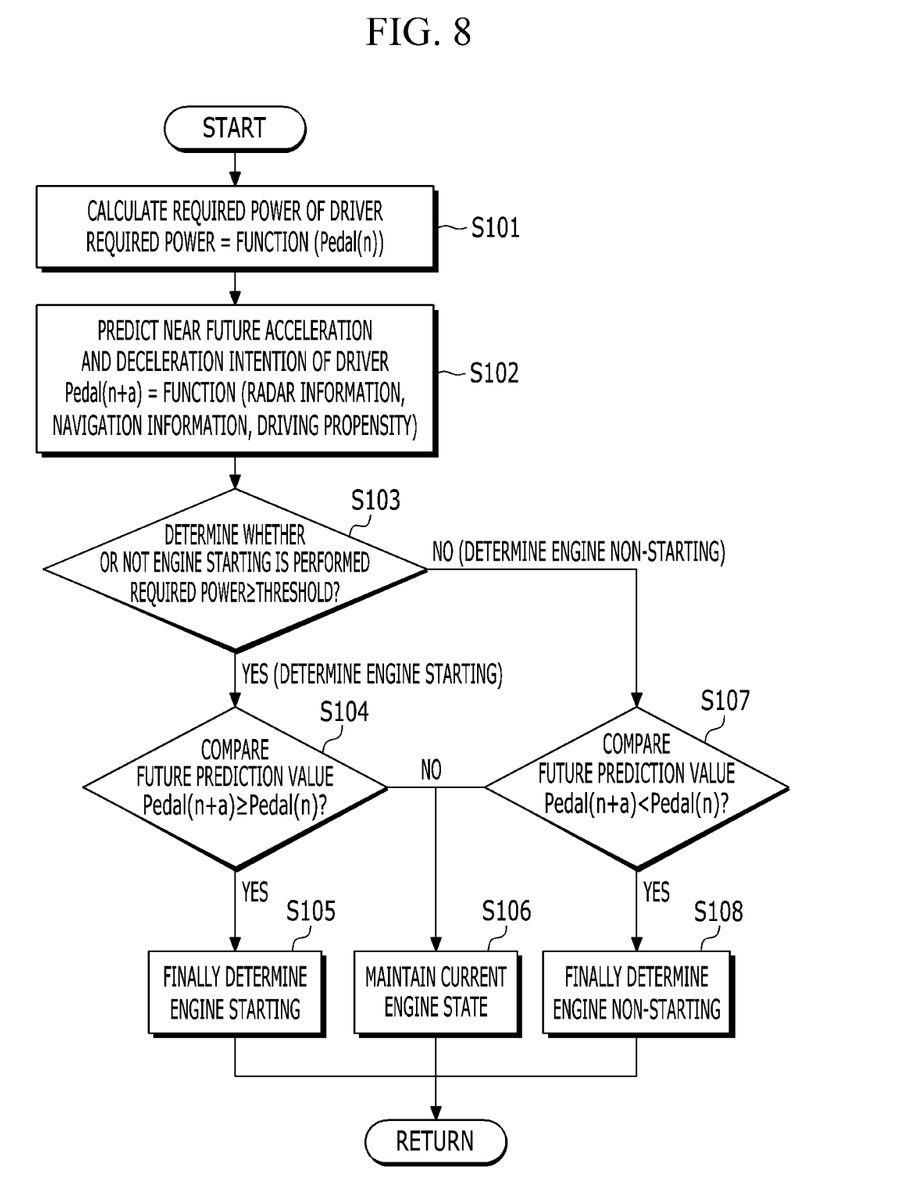
FIG. 8 is a flowchart illustrating a method for a driving mode conversion of a hybrid vehicle according to an exemplary embodiment of the present invention.

Meanwhile, a method for a driving mode conversion of a hybrid vehicle according to an exemplary embodiment of the present invention will be described in more detail with reference to FIG. 8, based on the system 100 for a driving mode conversion of a hybrid vehicle described above. FIG. 8 is a flowchart illustrating a method for a driving mode conversion of a hybrid vehicle according to an exemplary embodiment of the present invention. Referring to FIG. 8, the method for a driving mode conversion will be first described on the assumption that the hybrid vehicle is currently in an engine non-starting (OFF) state of the EV mode or in an engine starting (ON) state of the HEV mode.

The system 100 for a driving mode conversion according to an exemplary embodiment of the present invention may be configured to detect a position value (Pedal(n)) of a pedal using the driving information detecting unit 110, and calculate current required power of the driver (S101). The position value (Pedal(n)) of the pedal may be a current position of the accelerator pedal or a current position of the brake pedal, and a value of 'Pedal(n)' has a positive (+) value when a position variation of the accelerator pedal is detected, and has a negative (−) value when a position variation of the brake pedal is detected. Further, when the position of the accelerator pedal and the position of the brake pedal are simultaneously detected by a mis-manipulation of the driver (e.g., incorrect or inadvertent manipulation), the system 100 for a driving mode conversion may be configured to apply a brake override function to calculate the required power using the position of the brake pedal while ignoring the position of the accelerator pedal.

The system 100 for a driving mode conversion may be configured to generate the near future acceleration and deceleration intention prediction value of the driver using the acceleration and deceleration predicting unit 130 using the vehicle speed, the radar information, the navigation information, and the driving propensity of the driver as input information (S102). Particularly, the near future acceleration and deceleration intention prediction value indicates the position of the accelerator pedal or the position of the brake pedal based on an acceleration intention (e.g., an increase of the position of the accelerator pedal or a decrease of the position of the brake pedal, that is, an engagement amount) or a deceleration intention (e.g., a decrease of the position of the accelerator pedal or an increase of the position of the brake pedal, that is, an engagement amount) of the driver predicted in a near future as much as a predetermined time (e.g., predicted for about 5 seconds).

Further, the system 100 for a driving mode conversion may be configured to compare the current required power and the threshold for the engine starting, and when the current required power is the threshold or more, the system 100 for a driving mode conversion may be configured to determine the HEV mode and determine the engine starting (ON) (Yes in S103). In particular, the threshold may be a value to which hysteresis for starting the engine based on a change of the required power is applied, and whether the threshold or more on the hysteresis based on the change of the required power of the driver is satisfied may be determined. The system 100 for a driving mode conversion may then be configured to compare the near future acceleration and deceleration intention prediction value and the current position value of the pedal when the engine starting by the required power is determined to confirm whether the near future acceleration and deceleration intention prediction value continuously maintains the current position value or more of the pedal even in the near future (S104).

In particular, when the near future acceleration and deceleration intention prediction value is maintained to the current position value or more of the pedal (Yes in S104), the system 100 for a driving mode conversion may be configured to determine (e.g., a final determination) the engine starting (ON) (S105). For example, when the vehicle is currently in the engine non-starting (OFF) state as the EV mode, the system 100 may be configured to perform the conversion into the HEV mode based on the final determination of the engine starting (ON) and initiate an engine start-on (ON).

When the near future acceleration and deceleration intention prediction value is decreased to below the current position value of the pedal (No in S104), the system 100 may be configured to maintain a current driving mode and engine state (S106). For example, when the vehicle is currently in the engine non-starting (OFF) state as the EV mode, there is an advantage that an engine starting determination based on the current required power is determined as unnecessary according to a prediction of a decrease of near future required power and the engine non-starting state may be maintained. When the vehicle is currently in the engine starting (ON) state of the HEV mode, the system 100 may be configured to maintain the engine starting state.

However, the system 100 may be configured to set a first margin to allow the near future acceleration and deceleration intention prediction value to be decreased as much as a predetermined amount or less than the current position value of the pedal, and may be configured to determine the engine starting (ON) when the decrease amount of the near future acceleration and deceleration intention prediction value is within an allowance width by the first margin. When the first margin is set to about 10% of the current position value of the pedal, when the current position value of the pedal is about 10%, the system 100 may be configured to allow the engine starting even though the near future acceleration and deceleration intention prediction value is decreased to about 9%, and may be configured to determine an engine non-starting when the near future acceleration and deceleration intention prediction value is decreased to less than about 9%.

Meanwhile, in S103, when the current required power is less than the threshold, the system 100 may be configured to determine the EV mode and determine the engine non-starting (OFF) (No in S103). Additionally, the system 100 may be configured to compare the near future acceleration and deceleration intention prediction value and the current position value of the pedal when the engine non-starting (OFF) by the required power is determined to confirm whether the near future acceleration and deceleration intention prediction value is continuously maintained to less than the current position value of the pedal even in the near future (S107).

In particular, when the near future acceleration and deceleration intention prediction value is maintained to less than the current position value of the pedal (Yes in S107), the system 100 may be configured to determine the engine non-starting (OFF) (S108). For example, when the vehicle is currently in the engine starting (ON) state as the HEV mode, the system 100 may be configured to perform the conversion into the EV mode based on the final determination of the engine non-starting (OFF) and may be configured to execute an engine start-off (OFF).

Moreover, when the near future acceleration and deceleration intention prediction value is increased to the current position value or more of the pedal (No in S107), the system 100 may be configured to maintain a current driving mode and engine state (S106). For example, when the vehicle is currently in the engine starting (ON) state as the EV mode, there is an advantage that an engine non-starting determination based on the current required power may be determined as unnecessary according to a prediction of an increase of near future required power, and the engine starting state may be maintained. When the vehicle is currently in the engine non-starting (OFF) state of the EV mode, the system 100 may be configured to maintain the engine non-starting state.

Furthermore, the system 100 may be configured to set a second margin to allow the near future acceleration and deceleration intention prediction value to be increased as much as a predetermined amount than the current position value of the pedal, and may be configured to determine the engine non-starting (OFF) when the increase amount of the near future acceleration and deceleration intention prediction value is within an allowance width by the second margin. When the second margin is set to about 10% of the current position value of the pedal, when the current position value of the pedal is about 10%, the system 100 for a driving mode conversion may be configured to allow the engine non-starting even though the near future acceleration and deceleration intention prediction value is increased to about 11%, and may be configured to determine an engine starting when the near future acceleration and deceleration intention prediction value is increased to exceed about 11%. Thereafter, the system 100 may be configured to drive or operate the hybrid vehicle in the EV mode or the HEV mode based on the final determination of whether the engine starting is performed, and may repeat the above-mentioned operations until the starting-off.

As described above, according to an exemplary embodiment of the present invention, the unnecessary engine on/off may be prevented by predicting the near future driving intention of the driver taking account of the driving environment of the vehicle and the propensity of the driver, and utilizing the predicted near future driving intention of the driver in determining the EV/HEV determination. Further, due to the prevention of the unnecessary engine on/off, the fuel efficiency such as an amount of injection compensation, and the like for cranking energy and combustion stabilization may be improved, and due to a decrease in an impact of the driving mode conversion, the drivability may be improved.

Further, an acceleration and deceleration intention of the driver to which a driving propensity of the driving is reflected may be more accurately predicted by a neural network learning an acceleration and deceleration prediction model for each of driving propensities of the driver utilizing a machine learning technique, and the predicted acceleration and deceleration intention of the driver may be utilized in determining whether the engine starting is performed, thereby making it possible to prevent an inefficient driving mode conversion by an existing sudden change of the driving intention.

The above-mentioned exemplary embodiments of the present invention are not embodied only by the apparatus and method as described above. Alternatively, the above-mentioned exemplary embodiments may be embodied by a program performing functions, which correspond to the configuration of the exemplary embodiments of the present invention, or a recording medium on which the program is recorded. These exemplary embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A system for a driving mode conversion of a hybrid vehicle, comprising:
   a memory configured to store program instructions; and
   a processor configured to execute the program instructions, the program instructions when executed configured to:
   detect driving information based on a vehicle driving using a plurality of sensors of the hybrid vehicle;
   determine a driving propensity according to average speed of the vehicle, a position variation of an accelerator pedal, and a position variation of a brake pedal based on the driving information detected by the sensors;
   learn an acceleration and deceleration prediction model based on the driving information, and generate a near future acceleration and deceleration intention prediction value to which a driving environment of the vehicle and the driving propensity are reflected utilizing the acceleration and deceleration prediction model;
   determine whether an engine starting is performed by calculating current required power of a driver based on a position value of a pedal detected by the driving information detecting unit, and determine whether the engine starting is performed by comparing the near future acceleration and deceleration intention prediction value with the position value of the pedal; and
   turn the engine of the hybrid vehicle on or off based on the comparison of the near future acceleration and deceleration intention prediction value with the position value of the pedal.

2. The system of claim 1, further comprising a neural network that learns the acceleration and deceleration prediction model for each of driving propensities utilizing a machine learning technique using front behavior information obtained by a radar sensor, road environment information obtained by a navigation, and the driving propensity as input information.

3. The system of claim 2, wherein the program instructions when executed are further configured to generate the acceleration and deceleration prediction model for each of the driving propensities based on data accumulated through a test driving before a release of the vehicle utilizing the neural network.

4. The system of claim 3, wherein the program instructions when executed are further configured to generate the acceleration and deceleration prediction model for each of the driving propensities personalized by further reflecting vehicle behavior data learned through an actual vehicle driving of the driver after the release to the acceleration and deceleration prediction model for each of the driving propensities generated before the release of the vehicle.

5. The system of claim 1, wherein the near future acceleration and deceleration intention prediction value is a position of an accelerator pedal or a position of a brake pedal predicted in a near future as much as a set time from a point of time at which whether the engine starting is performed is determined by calculating the current required power of the driver.

6. The system of claim 1, wherein the program instructions when executed are further configured to determine the driving propensity as any one selected from the group consisting of: a mild driving propensity, a normal driving propensity, and a sporty driving propensity by classifying a short-term driving propensity index calculated by configuring a fuzzy membership function using at least one measurement factor of a position variation of the acceleration pedal, a position variation of the brake pedal, an average vehicle speed, and a degree of gradient detected by the driving information detecting unit as input variables at a predetermined ratio.

7. The system of claim 1, wherein the program instructions when executed are further configured to maintain an engine non-starting state when the near future acceleration and deceleration intention prediction value is decreased to less than the position value of the pedal when an engine starting based on the current required power is determined during the engine non-starting.

8. The system of claim 1, wherein the program instructions when executed are further configured to maintain an engine starting state when the near future acceleration and deceleration intention prediction value is increased to the position value or more of the pedal when an engine non-starting based on the current required power is determined during the engine starting.

9. A method for a driving mode conversion of a hybrid vehicle, comprising:
- calculating, by a controller, current required power of a driver based on a position value of a pedal detected by a driving information detecting unit;
- generating, by the controller, a near future acceleration and deceleration intention prediction value to which a driving environment of the vehicle and a driving propensity are reflected utilizing an acceleration and deceleration prediction model;
- comparing, by the controller, the current required power with a threshold for an engine starting and determining whether the engine starting is performed;
- comparing, by the controller, the near future acceleration and deceleration intention prediction value with the position value of the pedal and determining whether an engine starting is performed; and turning, by the controller, the engine of the hybrid vehicle on or off based on the comparison of the near future acceleration and deceleration intention prediction value with the position value of the pedal.

10. The method of claim 9, wherein the threshold is a value to which hysteresis for starting an engine based on a change of the current required power of the driver is applied.

11. The method of claim 9, wherein when the engine starting is determined, the method further includes:
- when the near future acceleration and deceleration intention prediction value is maintained to the position value or more of the pedal, determining, by the controller, the engine starting; and
- when the near future acceleration and deceleration intention prediction value is decreased to less than the position value of the pedal, maintaining, by the controller, a current engine state.

12. The method of claim 11, wherein a first margin is set to allow the near future acceleration and deceleration intention prediction value to be decreased as much as a predetermined amount or less than the position value of the pedal, and when a decrease amount of the near future acceleration and deceleration intention prediction value is within an allowance width by the first margin, the engine starting is determined.

13. The method of claim 9, wherein when an engine non-starting is determined, the method further includes:
- when the near future acceleration and deceleration intention prediction value is maintained to less than the position value of the pedal, determining, by the controller, an engine non-starting; and
- when the near future acceleration and deceleration intention prediction value is increased to the position value or more of the pedal, maintaining, by the controller, a current engine state.

14. The method of claim 13, wherein a second margin is set to allow the near future acceleration and deceleration intention prediction value to be increased as much as a predetermined amount or more than the position value of the pedal, and when an increase amount of the near future acceleration and deceleration intention prediction value is within an allowance width by the second margin, the engine non-starting is determined.

* * * * *